Oct. 3, 1939.  F. L. McCULLOCH  2,174,909

JUICING MACHINE

Filed May 7, 1938  3 Sheets-Sheet 1

Inventor
F. L. McCulloch
by Wilkinson & Mawhinney
Attorneys.

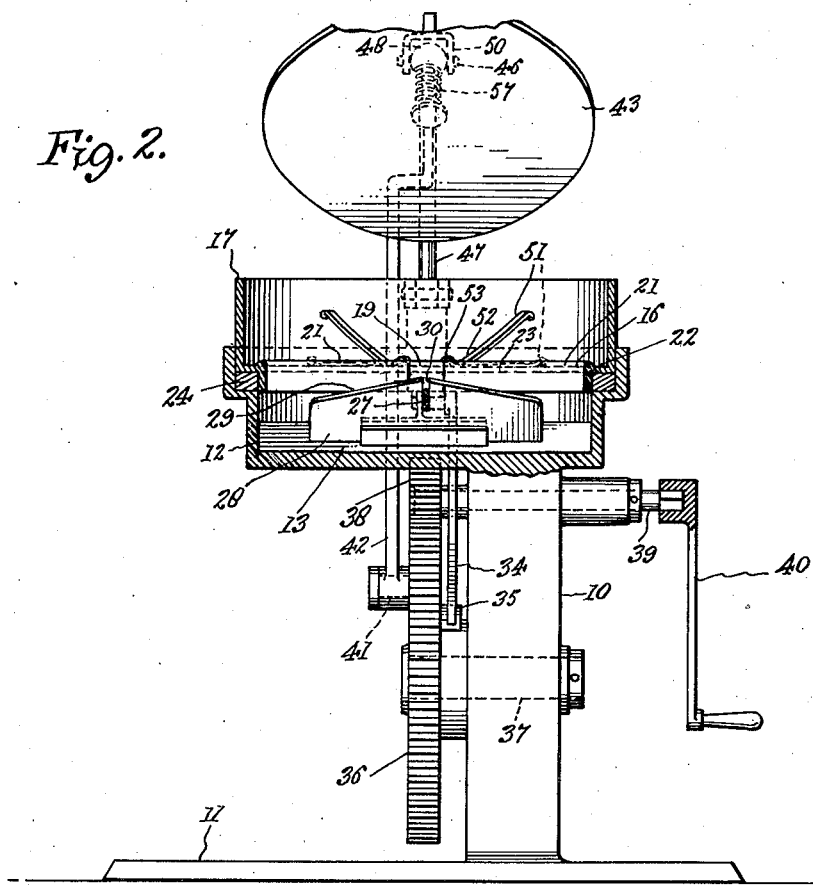
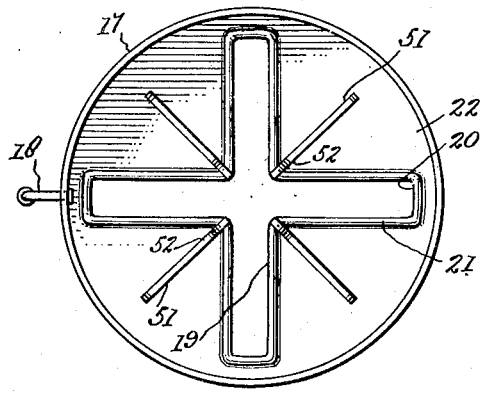
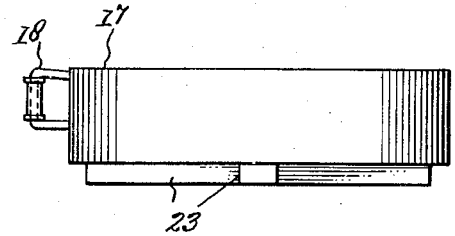

Oct. 3, 1939.  F. L. McCULLOCH  2,174,909
JUICING MACHINE
Filed May 7, 1938   3 Sheets-Sheet 3
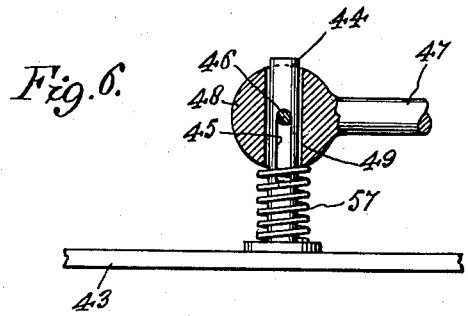
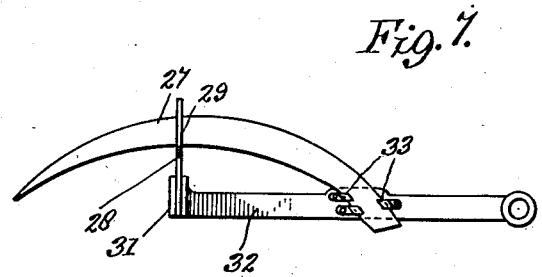
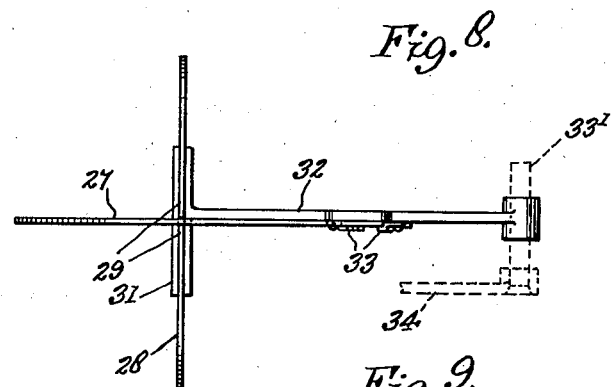
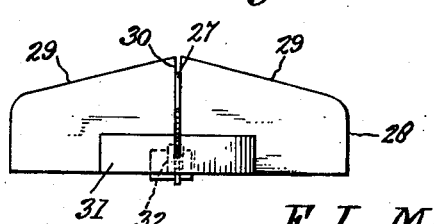
Inventor
F. L. McCulloch
By Wilkinson & Mawhinney
Attorneys.

Patented Oct. 3, 1939

2,174,909

UNITED STATES PATENT OFFICE 2,174,909

JUICING MACHINE

Frederick L. McCulloch, Tampa, Fla.

Application May 7, 1938, Serial No. 206,667

7 Claims. (Cl. 100—40)

The present invention relates to improvements in juicing machines and more particularly refers to a machine for expressing the juice from oranges, grapefruit and other citrus fruits.

It is an object of the invention to provide a compact and simply-operating machine for the expeditious squeezing or expressing of the juices from such citrus fruits as have an oily skin or rind, where the expressing operation is ordinarily attended with the squeezing of the oils from the skin or rind, the oils and the fruit juices customarily becoming commingled whereby the fruit juice depreciates commercially owing to the strong taste therein of the oil.

It is the primary purpose of the present invention to provide a machine which will eliminate the objectionable oils from the fruit juices without in any way interfering with the expressing operation of the juices.

In a more specific aspect the invention has for its further object to exclude the oils from the fruit juices by at all times maintaining the same apart so that at no time will the oils contaminate and pollute the fruit juices, the oils being maintained apart and removed separately from the juices.

The invention also contemplates an improved construction of knife mechanism for cutting through the skin or rind of the fruit and an improved operating mechanism for said knives, and in operating in conjunction with the knives a presser plate, the knives and presser plate coming together upon the fruit in timed relation.

A more specific object of the invention is also to provide an improved fabricated knife construction in which the individual blades of the knife may be removed and replaced.

A still further object of the invention is to provide for a more firm holding of the knives in place by the action of the pressure developed from the penetrating action of the knives on the fruit.

A still further object of the invention is to provide a cushion presser plate for the purpose of compensating for destructive strains in the mechanism and to allow of a certain loose play whereby to avoid breakage where variations in sizes of fruits are encountered.

With the foregoing and other objects in view, the invention will be more fully described hereinafter, and will be more particularly pointed out in the claims appended hereto.

In the drawings, wherein like symbols refer to like or corresponding parts throughout the several views.

Figure 2 is a vertical section taken substantially along the line 2—2 in Figure 1.

Figure 3 is a top plan view of the improved cup employed.

Figure 4 is a side view of the same.

Figure 6 is an enlarged fragmentary section showing a detail of the cushion mechanism.

Figure 7 is a side view of the improved knife and its operating arm.

Figure 8 is a plan view of the same, and

Figure 9 is an end view of the knife structure.

Figure 1:
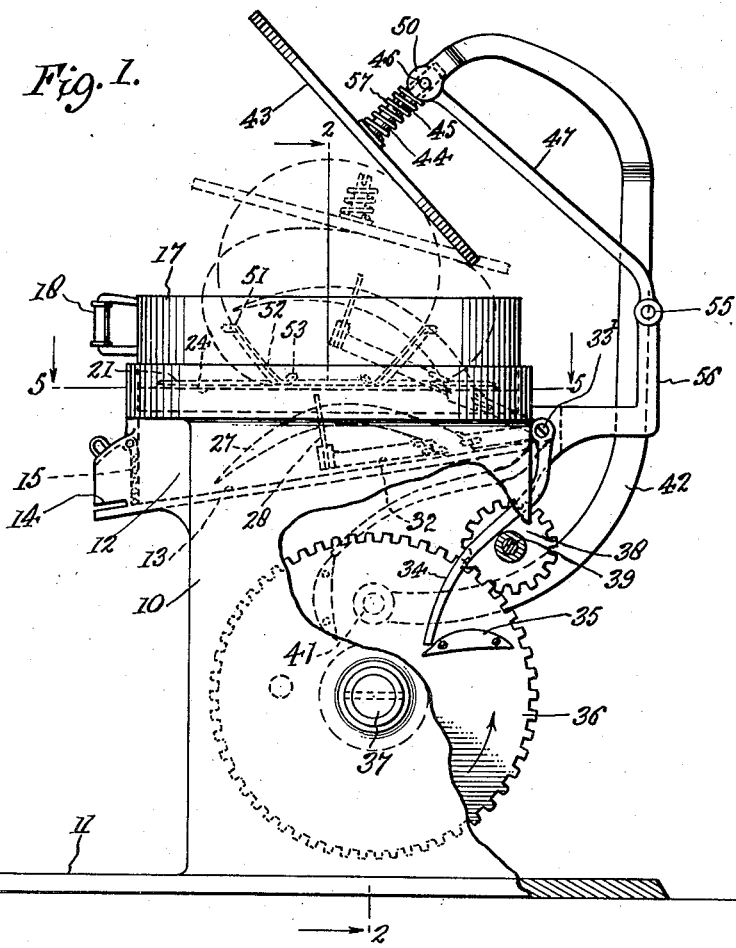
Figure 1 is a side view, with parts broken away and with parts shown in section, of an improved juicing machine constructed in accordance with the present invention.

Referring more particularly to the drawings, 10 designates generally a pedestal or frame for the machine having a flanged base 11 on which the machine stands. Carried by the frame, or built within the same, is a juice receptacle 12 having an inclined bottom 13 leading toward one end of the machine and terminating in a spout 14 by which the pure fruit juice is delivered to a can or other depository. In the spout 14 is a strainer 15 of any appropriate form for excluding seeds or the like from the juice.

The receptacle 12 receives therein a guide member 24 having a seat 16 or horizontal surface for removably receiving a cup 17. The cup 17 is provided with a handle 18 for convenience in removing and seating the same in place.

The cup as shown in Figure 3 is formed as to its bottom with intersecting slots 19 and 20 meeting substantially centrally so that the two slots form a cross. This cross-shaped slot 19, 20 has a rim 21 upstanding all around the same at a substantial elevation above the bottom 22 of the cup, the rim 21, in Figure 2, being most clearly shown in this upstanding position. Cross knives are adapted to be thrust up through the cross slots 19, 20 to penetrate the fruit which is held in the cup as more particularly described hereinafter.

If preferred an extension 23 may be formed on the bottom 22 of the cup in a downward prolongation of the rim 21 taking the form of the cross-slots for the purpose of reinforcing the slotted bottom 22 of the cup particularly the weakest point, namely along the margins of the cross slots 19 and 20.

Figure 5:
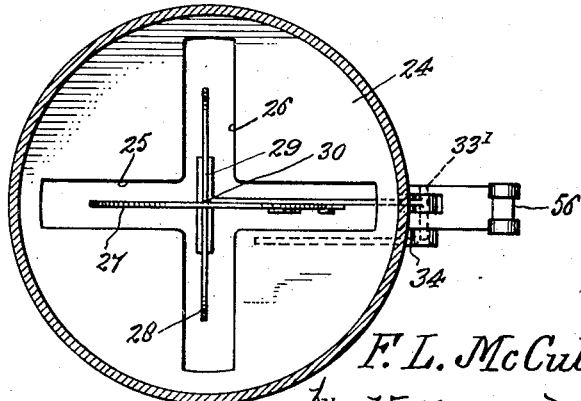
Figure 5 is a horizontal section taken on the line 5—5 in Figure 1.

A guide member 24, shown more particularly in Figure 5, is made a part of the framework or may be made separately and mounted within the juice container. The guide member 24 is formed with cross slots 25 and 26 adapted to rather snugly receive the extension 23 of the cup 17 when the same is put in place upon the frame.

A knife is carried within the frame below the cup 17, the knife being more particularly shown in Figures 7, 8 and 9 and consisting generally of a curved blade 27 extending at right angles to a cooperating flat blade 28 having inclined upper edges 29 rising from low ends to a high central portion at which is formed a slot 30 to receive the curved blade 27. In other words the knife 27 is disposed at right angles to and through the companion knife blade 28. The blade 28 is set in a socket 31 at the free end of an operating arm 32. The operating arm carries clamps 33 in which the butt end of the knife 27 is seated and into which it is more firmly thrust by pressure of the fruit upon the upper curved cutting edge of blade 27 as the knife is forced upwardly into the fruit.

The arm 32 is affixed upon a shaft 33'. The arm 32 lies beneath the long slot 25 in the guide member 24, the blade 27 rises through the long slot 25 and the flat blade 28 lies through the cross slot 26. In a similar way the curved blade 27 lies upwardly through the slot 19 in the bottom of the cup and its extension while the flat blade 28 rises upwardly through cross slot 20 of the cup.

The shaft 33' is journaled in the frame. Affixed to the shaft 33' outside the juice receptacle 12 is an operating lever 34. The juice receptacle 12 may be offset upwardly, as indicated in Figure 2, so as not to interfere with the oscillating vertical movement of lever 34 which is disposed in the path of a rotating cam 35 whereby the lever 34 is periodically lifted by the cam 35 to also raise the knives.

The cam is carried by a gear wheel 36 mounted upon a shaft 37 journaled in the pedestal or frame 10 and meshing with pinion 38 supported on a shaft 39 also mounted in the framework. The shaft 39 may be turned by hand, as by the hand crank 40.

The rotary wheel 36 also carries a headed pin 41 to which is pivotally coupled the lower end of the operating arm 42. This operating arm 42 is offset so as to extend about and above the cup 17, the upper end of the arm 42 being connected to operate, that is to lift and lower, the presser plate 43. The presser plate 43, as shown in Figure 6, has affixed thereto a stem 44 slotted as indicated at 45 to slide over a pin 46 carried by the rod 47. The rod 47 is pivoted at its lower end, as indicated at 55, to an upstanding bracket 56 of the frame. A coil spring 57 is wound helically about the stem 44 and abuts against the head 48 and the presser plate 43. The rod is formed with a head 48 in which is an opening 49 for the stem 44 to slide in. The head 48 is received between the perforated ears 50 of the operating arm 42, the head 48 being held in the ears by means of the pin 46.

Guide strips 51 are shown more particularly in Figures 2 and 3, the same formed preferably of spring metal or the like having upper higher ends and lower ends which are curved reversely in two directions, including a seat curve 52 curving downwardly toward the bottom of the cup and actually seated upon the bottom just inside the upstanding rim 21. At the seat portion the strips or guides 51 may be soldered or otherwise affixed to the bottom of the cup. Hump portions 53 are formed in the guides to clear the rim 21.

In operation, an orange, grapefruit or the like is placed upon the spring or wire guides 51, the function of which is to hold the fruit in the center of the cup until the presser plate 43 can descend upon the same and hold the fruit in position. The crank handle 40 is now turned to cause the wheels 36 and 38 to rotate, thus rotating the cam 35. The cam 35 and also the pin 41 on the wheel 36 rotate in the direction of the arrow indicated in Figure 1. The relative arrangement between the pin 41 and the cam 35 is such that the pin 41 will travel in advance of the cam 35. Thus when a piece of fruit is put in the cup 17 the presser plate 43 will first be brought down upon the fruit so as to hold the same in the cup. In this position the presser plate will act as a backing to prevent the fruit being forced upward when the knife is brought up beneath the fruit as is then promptly done because the cam 35 is only slightly displaced angularly on the wheel 36 from the pin 41. The cam 35 raises the lever 34 and the arm 32 causing the knives 27 and 28 to cut through the bottom of the fruit in cross cuts over comparatively wide linear distances. The cam 35 extends only a short circumferential distance about the wheel 36 so that it will pass from under the lever 34 in a short time allowing the knives to fall. The pin 41 however will still be travelling toward the bottom of wheel 36, during all of which time the presser plate 43 is being lowered upon the cut fruit, thus extruding and expressing the juice therefrom through the cross cuts down directly into the slots 19 and 20 of the cup and the slots 25 and 26 of the guide member 24, the juice being caught upon the inclined bottom 13 and deflected out the spout 14, the juice being strained by strainer 15 so that only pure juice is delivered from the spout 14.

On the downward stroke the fruit is fairly completely flattened out in the cup 17. The pressure put upon it may be so great as in the final analysis that the wires or springs 51, as shown in Figure 2, are flattened down to the dotted line position. In order that breakage of the parts be avoided during the final downward thrust of the presser plate 43, such plate is yieldably carried by the head 48. When the presser plate 43 is unable to go down any further, but the mechanism requires that the head 48 still descend, the pin 46 may move in slot 45 while coil spring 57 is compressed. When the operating arm 42 again rises, the spring 57 will expand and the stem 44 move downwardly in head 48 until pin 46 contacts the upper wall of slot 45.

The arm 42 lifts and lowers the presser plate 43, while the control rod 47 defines the arc of movement of the plate 43.

As above stated the juice will be directly squeezed into the slots of the cup 17 by reason of the cross cuts made in the fruit directly over these slots. As the fruit is flattened upon the bottom of the cup 17 oil will quite naturally be expressed from the skin or rind of the fruit but such skin or rind does not lie over the slots and if it did the slots would not form any backing against which the presser plate could operate to extrude oils from the skins. Thus the oils which are pressed out of the skin or rind are collected upon the floor 22 of the cup and are actually prevented from overflowing into the slots 19 and 20 by the upstanding rim 21. The cup 17 is lifted off the machine as frequently as necessary before the collected oil reaches such volume as to overflow the rim 21.

The springs or wires 51 will free the hulk after the expressing operation due to the inherent resiliency of these springs in straightening themselves out. The reverse curves given to these springs will tend to elevate the outer portions to the upper position shown in full lines in Figure 2 and this action will tend to lift the remains of the fruit so that it may be easily removed by hand. The cup can also be lifted out and inverted to drop the hulk and oil at the same time into a suitable receptacle.

In this manner only clear juice goes to the glass or container. The oil, pulp, rag and seed are left in the peel and thrown out when the cup 17 is removed. Some fruit has extra thick peel. In such cases the spring 57 operates to prevent breakage in the connections between the presser plate 43 and its operating mechanism.

The machine is easily cleaned as the cross knives can be lifted out, cleaned and sharpened. Pressure in action from the top tends to tighten the knives in their mountings.

The cup 17 can be easily put in place owing to the extension 23 and its fit in the open seat 16.

As indicated in dotted lines in Fig. 1 the cross-knife releases and drops before it cuts through the top peel or skin of the orange. Oil accumulates on the top peel while it is being pressed and if the orange was cut through the oil would run down in the juice. The knife may reach only within three-eighths or one-half inch of the pressure plate before it releases and drops back in the slots.

The knives make a clear incision in the bottom of the orange and continue to move upward while the pressure plate is pressing down until the knife and pressure plate are within a predetermined distance of one another, then the knife is released and drops back in the slot as the pressure plate continues to move down and force the juice out through the cuts in the bottom of the orange. The top of the orange is not cut and any oil forced out the top of the orange remains on the skin and cannot get in the juice as there is no opening for it to go through. The shape and position of the cam 35 governs the speed and operation of the knife.

It is obvious that various changes and modifications may be made in the details of construction and design of the above specifically described embodiment of this invention without departing from the spirit thereof, such changes and modifications being restricted only by the scope of the following claims:

What is claimed is:

1. A juicing machine comprising a fruit receiver, a presser device, a knife, said fruit receiver having an opening in the bottom thereof to receive said knife, means to urge said presser device and knife upon the fruit in substantially opposite directions whereby to incise the fruit only along the slot and to express the juice through the slot, and means for excluding the oils expressed by the presser device from said slot.

2. A juicing machine comprising a fruit receiver having a cross slotted bottom portion, a movable knife of cross form, means for driving the knife upwardly through the slotted bottom of the receiver, a presser plate above the receiver, means for lowering the presser plate upon the fruit, and means to separate the juice expressed from the fruit through the slotted bottom of the receiver and the oil expressed from the rind into the receiver.

3. A juicing machine comprising a fruit receiver having a slotted bottom, a movable knife below the bottom, means for moving the knife upwardly through the slot, a presser plate above the receiver, means for raising and lowering said presser plate, said receiver having a rim extending about the edge of the slot.

4. A juicing machine comprising a receiver for the fruit having a slot therein, a rim around the slot upstanding from the bottom of the receiver, a knife moving up and down through the slot to cut the fruit above the slot, and means for pressing down upon the fruit to express the juice through the incision directly into the slot and for expressing the oils from the rind only against the bottom of the receiver at a level below that of said rim.

5. A juicing machine comprising a receiver having a slot in the bottom thereof and having an upstanding rim about said slot, means for cutting the fruit in line with said slot, means for pressing the fruit downwardly against the bottom of the receiver, spring strips having upstanding outer portions with lower parts bent into reverse curves with a convex seating portion presented against the bottom of the receiver and a reversely curved humped portion extending over said rim, the outer portions of said spring strips adapted to be forced down by the squeezing of the fruit and to subsequently lift the squeezed fruit clear of the bottom of the receiver.

6. A juicing machine comprising a receiver for fruit, a presser plate above said receiver having a slotted stem, a pivoted member for controlling the direction of movement of said presser plate, a loose connection between said pivoted member and said presser plate, yieldable means for holding the presser plate in an extended position from said member, and means for moving said presser plate and pivoted member.

7. A juicing machine comprising a receiver for fruit having a slot therein, a knife below the receiver operating through said slot, a presser plate above the receiver, an arm connected to said presser plate, a lever connected to operate said knife, a rotating cam for actuating said lever, and rotary means for raising and lowering said arm, said last named means travelling slightly in advance of the high point of said cam.

FREDERICK L. McCULLOCH.